July 11, 1939. C. SCHÜRMANN 2,165,731
ELASTIC COUPLING
Filed June 14, 1937 3 Sheets-Sheet 1
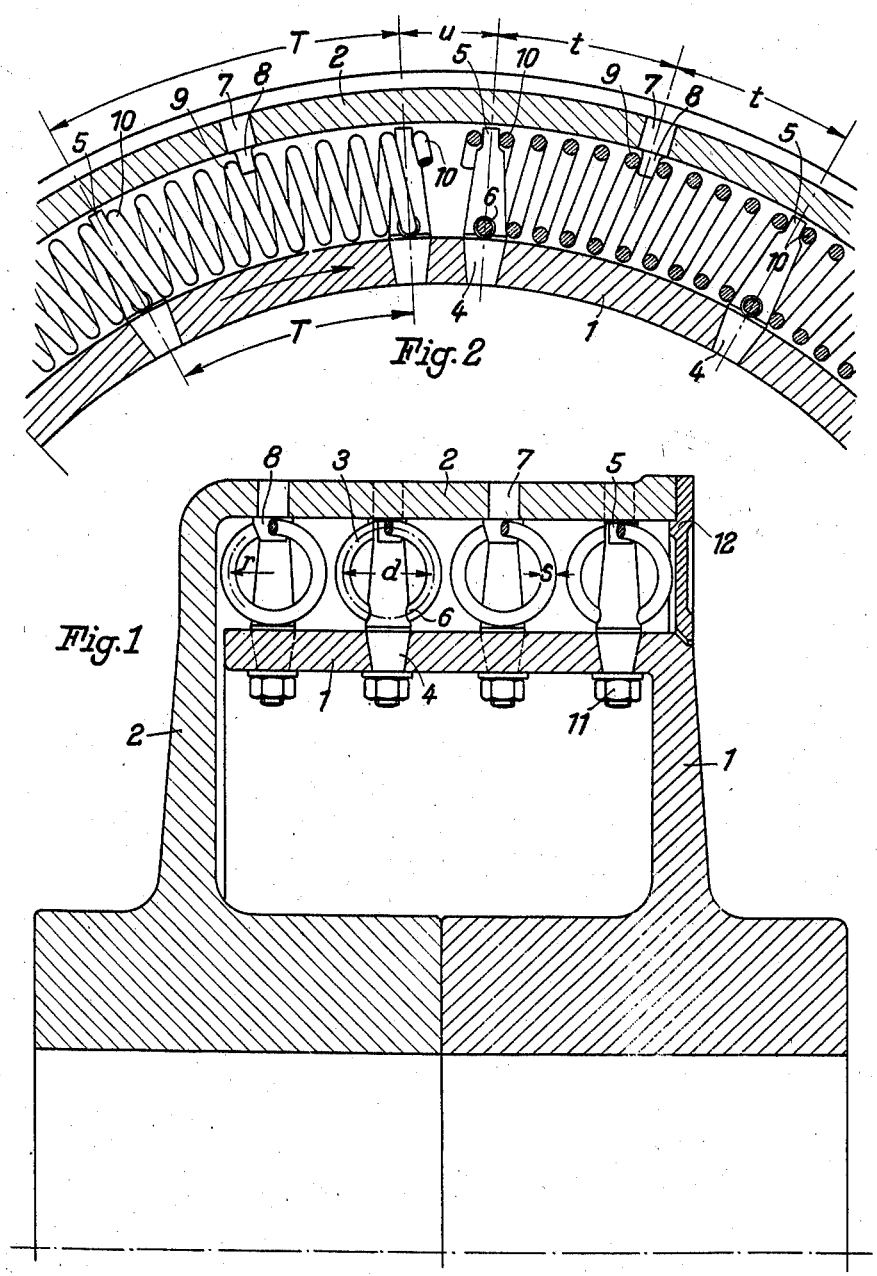
Inventor:
C. Schürmann
By Glascock Downing & Seebold
Attys.

July 11, 1939.　　C. SCHÜRMANN　　2,165,731
ELASTIC COUPLING
Filed June 14, 1937　　3 Sheets-Sheet 2
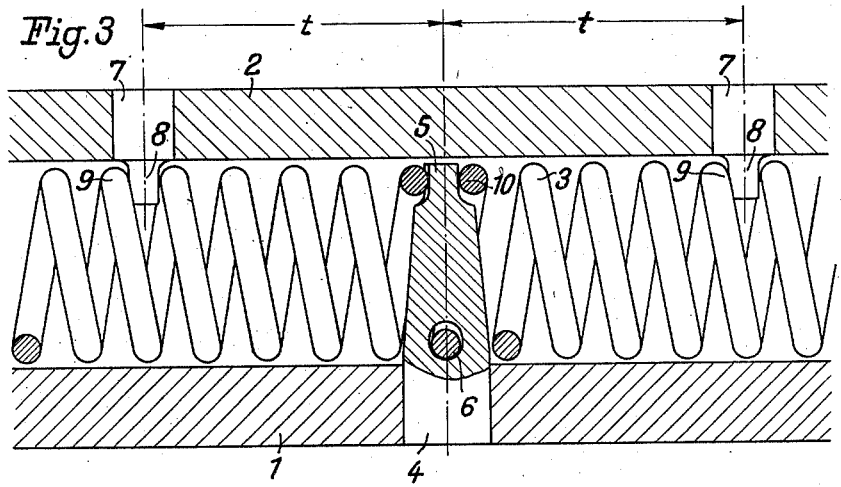
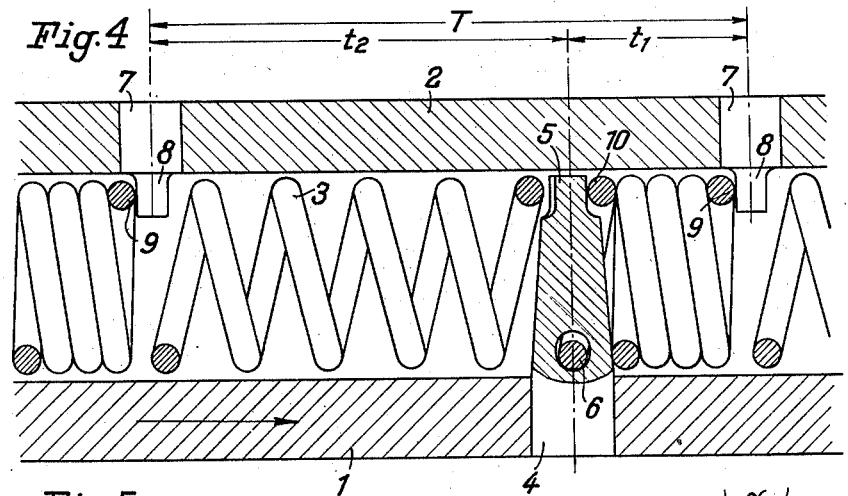
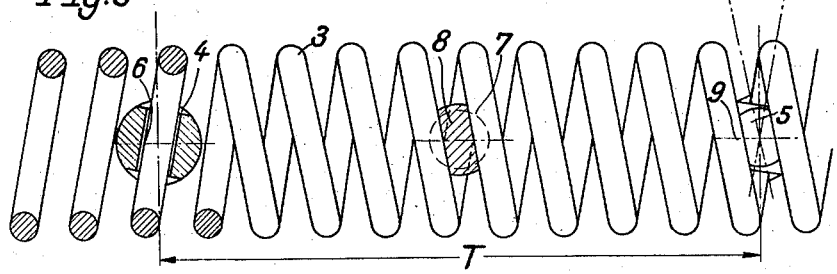
Inventor:
C. Schürmann
By Glascock Downing & Seebold
Attys.

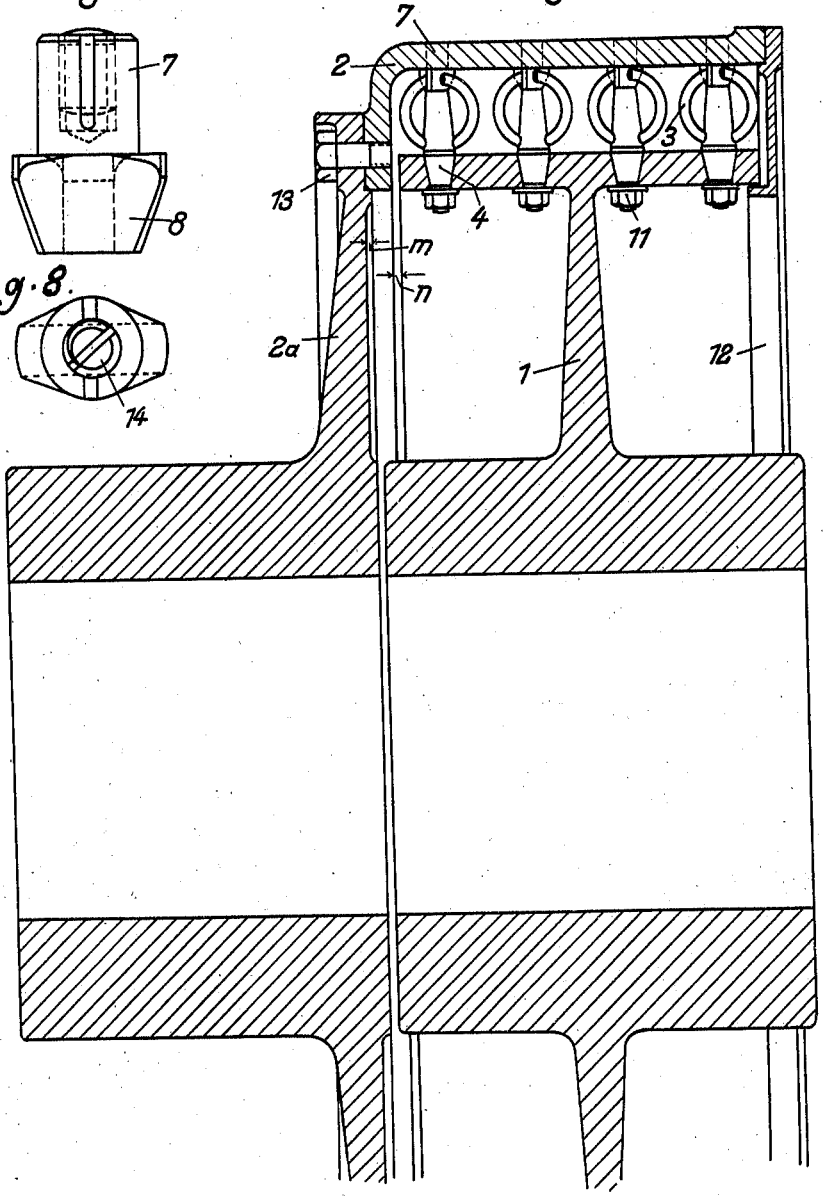

Patented July 11, 1939

2,165,731

UNITED STATES PATENT OFFICE 2,165,731

ELASTIC COUPLING

Carl Schürmann, Dusseldorf, Germany

Application June 14, 1937, Serial No. 148,243
In Germany April 2, 1937

13 Claims. (Cl. 64—15)

This invention relates to an elastic coupling, wherein during transmission of power helical or spiral springs, subdivided by stops, are partly compressed and partly drawn apart in known manner.

Existing couplings of this class are open to the objection that the stops exert an eccentric pressure or pull upon the springs and thereby cause rapid destruction of the springs or stops. Furthermore, although by equidistant arrangement of the stops the springs are divided into portions having the same number of turns, loading of the coils subjected to stretching strain is nevertheless less than that of the turns exposed to compressive strain. For a reason to be explained later on the maximum permissible loading of the springs with respect to tensile stress cannot be fully utilized. Another drawback is that the inclination of the untensioned spring or the clear distance between two adjacent coils does not conform to the maximum permissible deflection; if the distance is too great, overstressing of the springs may easily occur, and if it is too small, the permissible maximum loading of the springs is not utilized. This is usually due to the wrong selection of the mean diameter of the coiling relative to the thickness of the wire, whereby also the maximum permissible loading is determined.

By way of example, one form of the invention is illustrated in the accompanying drawings, in which Figures 1 to 8 show an elastic coupling without the defects mentioned.

More particularly:

Figure 1 is a longitudinal section of an elastic coupling comprising the half members 1 and 2, with 1 assumed to be the driving member, and four circularly bent springs 3 arranged side by side and consisting of one or more parts, each of which has at least two subdivisions of at least two turns.

Fig. 2 is a cross section of a spring ring and of the two halves of the coupling vertically to the axis of rotation.

Fig. 3 shows the spring in untensioned condition and how it is secured to the two halves of the coupling.

Fig. 4 shows the spring at maximum loading of the coupling. At the direction of rotation indicated by the arrow the turns of the subdivision $t_1$ are compressed between the stops 5 and 8 until they contact, i. e., to the greatest possible degree of flexibility F, whilst the adjacent subdivision $t_2$ surrounding the stops 5 and 8 is extended to the same degree F.

Fig. 5 is a top view of the untensioned spring.

Fig. 6 is a view of an elastic coupling of the same general type, but with the outer half or cylinder 2 subdivided; and Figs. 7 and 8 show an engaging member of the outer cylinder.

Referring to the drawings, the distance between two adjacent engaging members or stops 8 of the coupling member 2 or between two adjacent stops 4 of the coupling member 1 is designated T, whilst the distance between two adjacent stops 5 and 8 of both halves of the coupling in untensioned condition of the spring is designated $t=0.5\ T$.

To eliminate the defect of eccentric transmission of spring pressure in the new coupling whose halves form simple rotary bodies, the stops in one half thereof, preferably in the outer one, are constructed as teeth 8 which are rotatably secured to cylindrical pins 7 and are obliquely adjustable according to the inclination of the spring. The engaging members or stops 4 of the other half 1 are so constructed that they pass diametrically through a coil of the spring and project with their outer end 5 like teeth between two adjacent turns, as indicated in Figs. 2, 3 and 4. The base 4 of the stop 5 is thus subjected to a very great bending moment requiring a great moment of resistance which is imparted to it by causing the base fully to surround one turn of the spring, so that the resistance involves the width of the base and the double distance of two turns less one wire thickness $s$. In this way, the number of turns within a subdivision T always remains an even one. If teeth 7, 8 provided in the half member 2 were inserted in the member 1, the number of turns of a subdivision T would be an odd one.

Uneven loading of the turns subjected to tensile and compressive stresses and the impossibility of fully utilizing the maximum capacity of the springs as to pull are due to the following facts; Fig. 4 clearly shows that the compression F of the spring over the distance $t_1$ between the stops 8 and 5 covers only four full turns, whilst the extension F of the portion $t_2$ subjected to tensile stress is distributed over six full turns between the stops 5 and 8. Each single turn of the portion $t_1$ is thus compressed one-fourth, but each turn of the portion $t_2$ is extended only one-sixth, i. e., the portion $t_1$ is tensioned one and a half times as much as the portion $t_2$ at the same change in length. The portion of the spring subjected to tensile stress cannot be loaded therefore up to the permissible limit. If the stop 5 were to be displaced between the teeth 8 to the extent of one turn (in Fig. 2 to the left) to somewhat overcome this inequality, the coupling could be used only for one direction of rotation indicated by the arrow.

In couplings, however, which, as usually required, have to transmit the same turning moment in both directions uneven spring loading can be eliminated only by inserting springs having a certain initial tension with respect to pull, i. e., by making the subdivision T in the coupling larger than corresponds to the untensioned spring. This insures absolute equality of the maximum permissible compressive and tensile stresses in all subdivisions $t_1$ and $t_2$ during transmission of the greatest torsional moment for both directions of rotation, so that all spring portions are utilized up to limit load. Initial tensioning of the spring prevents also excessive fluctuations at sudden loads.

The drawback that the inclination of the untensioned spring or the distance between two adjacent coils does not correspond to the maximum permissible deflection can be overcome by ascertaining the most favorable value for the ratio $d:s$, $d$ representing the mean diameter of coil and $r$ the mean radius of the spring. This ratio determines the maximum permissible loading $p$ of the spring at a given wire thickness $s$ and also the greatest permissible deflection. It is known that the maximum permissible loading of a helical spring made of round wire is covered by the formula $$p = \frac{\pi . s^3 . cb}{16.r}$$

$cb$ being the coefficient of bending. If for instance $r$ is equal to $3s$ and $cb=7500$ kg./qcm. (for hardened springs), the formula will be $$p = \frac{\pi . s^3 . 7500}{16.3.s} = 490 s^2$$

The maximum permissible deflection for each turn is $$f = \frac{64 r^3 . p}{s^4 . G}$$

G representing the modulus of shear for hardened helical springs $=850,000$ kg./qcm. If $r$ is equal to $3s$ and $p=490 \ s^2$, it follows that the formula will be $$f = \frac{64.(3.s)^3 . 490 s^2}{s^4 . 850,000} = f = \frac{850,000 s^5}{850,000 s^4} = s$$

This shows that under the conditions assumed the untensioned spring may have an inclination or pitch $=2s$, so that at a relatively very high load there is still a permissible deflection attained as elastic deviation of the coupling. According to intended use, the most favorable value of $d:s$ lies between 5 and 7 and that of $r:s$ between 2.5 and 3.5 at a number of turns of $i=3$ to 6 in one subdivision $t$. The springs may be of round or rectangular cross section.

In assembling a coupling all spring parts are first secured with their associated stops 4 to the inner cylinder of the half coupling 1 with the necessary initial tension. Then the stop members 7, 8 are inserted in the outer cylinder 2, whereupon the cylinder 1 with all springs is pushed into the cylinder 2 and the lateral cover 12 screwed on.

In constructing the inner engaging members 4 it should be observed that the angle $\alpha$, Fig. 5, formed by the lower bore 6 with the upper teeth 5, corresponds to the double angle of inclination of the untensioned spring.

The inner and outer stops 4 or 7 may be arranged side by side or one after the other, and their number may be chosen at will.

It is further possible to flange the outer cylinder 2 to the front wall of the member 2 so as to facilitate the installation of the coupling if the axes are only slightly displaceable in longitudinal direction.

Such a construction is shown in Fig. 6. The half coupling 2 is subdivided into members 2 and 2a. The axial play of the outer coupling cylinder 2 relative to the inner cylinder 1 is on every side $=n$, or on the whole $=2n$. During installation of the coupling the outer cylinder which at the shipment of the coupling is already placed on the inner coupling member 1 is pushed back as far as possible so as to reduce the distance $n$ to zero. If the centering projection $m$ is not larger than $n$, the coupling can be vertically lowered into its bearings without any displacement of its axis.

The outer stops shown in Figs. 7 and 8 must be barely rotatable in their bores to permit insertion of the tooth 8, as stated, but, on the other hand, sufficiently secured to avoid subsequent loosening and rotation when the inner coupling member is removed. For this purpose the fixed pin 7 is slotted so as to be always held like a plug contact. The slot is preferably disposed vertically to the tooth 8 and affords the added advantage that the inclined position of the tooth can be observed and regulated also from the outside.

To provide for fixing the pin 7 after correct angular adjustment it may possess a centrical threaded bore in addition to the slot. The associated screw 14 is slightly conical to clamp and hold the stop during insertion.

I claim:

1. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, the stops carried on the inner coupling member projecting entirely through the springs, and the distance between two adjacent stops of one and the same coupling member being greater than the length of the interposed spring in untensioned state.

2. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, wherein at least the stops of one coupling member are of such a length, that they support the spring coil part opposite to them.

3. Elastic coupling, according to claim 2, characterized therein, that the stops possess an engaging member for engaging between opposite coils.

4. Elastic coupling according to claim 1, wherein the base portion of the stops of a coupling member possess a passage for the reception of a sector of a spring coil.

5. Elastic coupling according to claim 2, wherein the stops of a coupling member possess a passage for reception of a spring coil.

6. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, wherein the stops have a foot member rotatably inserted in the coupling member and are adjusted in the direction of the inclination of the spring.

7. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, the distance between two adjacent stops of one and the same coupling member being greater than the length of the interposed spring in untensioned state, the spring portions disposed between the stops, having an even number of complete turns.

8. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, the distance between two adjacent stops of one and the same coupling member being greater than the length of the interposed spring in untensioned state, slotted foot members on the stops being rotatably disposed in the coupling members.

9. Elastic coupling, comprising an inner coupling member and an outer coupling member, outwardly directed toothlike stops on the inner coupling member, inwardly directed toothlike stops on the outer coupling member and initially tensioned helical springs interposed between a stop of the inner coupling member and a stop of the outer coupling member to insure equality of the maximum permissible compressive and tensile stresses in all spring portions during transmission of power, the distance between two adjacent stops of one and the same coupling member being greater than the length of the interposed spring in untensioned state, slotted foot members on the stops being rotatably disposed in the coupling members and conical screws for insertion in the slotted foot members for holding the latter in position.

10. In a coupling, two coupling members mounted for relative movement with respect to each other, a coil spring interposed between the coupling members, at least two spaced stops projecting from one of the coupling members, each of said stops extending into the spaces between the coils of the spring to a point at least equal to the inside diameter of the spring, at least one stop member projecting from the other coupling member and positioned intermediate of said spaced stops, said last mentioned stop extending through said spring in a direction diametrically opposite with respect to said first mentioned stops, and said last mentioned stop being of such a length that the outer end thereof projects beyond the outside diameter of the spring.

11. In a coupling, two coupling members mounted for relative movement with respect to each other, a coil spring interposed between the coupling members, two spaced stops carried by one of the coupling members, said stops being aligned with respect to each other in the direction of relative movement between the two coupling members, said stops engaging the spring coils at similar points on the circumference thereof, another stop carried by the second coupling member, said other stop engaging intermediate coils of the spring and the circumferential parts thereof which are aligned with said first mentioned stop.

12. In a coupling, two coupling members mounted for relative movement with respect to each other, a coil spring interposed between the coupling members, means fixed to one coupling member engaging the coil spring at one point, means fixed to the other coupling member in a spaced relation with respect to said first mentioned means, said last mentioned means engaging two parts of the spring, and one of said engaged parts being aligned with respect to the first mentioned means and in the direction of relative movement between the two coupling members.

13. In a yieldable coupling, two relatively movable coupling members, a coil spring arranged between the coupling members and having spaces between the coils in an untensioned state thereof, a stop projecting from one of the coupling members to engage said spring, the width of said stop member adjacent the coupling member being equal to the spaces between two coils in the untensioned state.

CARL SCHÜRMANN.